(12) United States Patent
Pan et al.

(10) Patent No.: US 9,031,015 B2
(45) Date of Patent: May 12, 2015

(54) METHOD AND DEVICE FOR ALLOCATING DOWNLINK RESOURCE AND RECEIVING DOWNLINK DATA

(75) Inventors: Xueming Pan, Beijing (CN); Zukang Shen, Beijing (CN); Deshan Miao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 313 days.

(21) Appl. No.: 13/519,828

(22) PCT Filed: Dec. 30, 2010

(86) PCT No.: PCT/CN2010/002217
§ 371 (c)(1),
(2), (4) Date: Jun. 28, 2012

(87) PCT Pub. No.: WO2011/079525
PCT Pub. Date: Jul. 7, 2011

(65) Prior Publication Data
US 2012/0294250 A1 Nov. 22, 2012

(30) Foreign Application Priority Data

Dec. 31, 2009 (CN) .......................... 2009 1 0217503

(51) Int. Cl.
*H04W 4/00* (2009.01)
*H04W 72/04* (2009.01)

(52) U.S. Cl.
CPC ........ *H04W 72/0453* (2013.01); *H04W 72/042* (2013.01)

(58) Field of Classification Search
CPC .......... H04W 72/0452; H04W 72/042; H04W 72/04; H04W 72/0453
USPC ....................................................... 370/329
See application file for complete search history.

(56) References Cited

U.S. PATENT DOCUMENTS 6,885,697 B1 * 4/2005 Tokunaga et al. ............. 375/222
8,374,162 B2 * 2/2013 Higuchi et al. ............... 370/343

(Continued)

FOREIGN PATENT DOCUMENTS

CN 101127719 2/2008
CN 101155400 4/2008

(Continued)

OTHER PUBLICATIONS

International Search Report for PCT International Application No. PCT/CN2010/002217 dated Apr. 7, 2011.

*Primary Examiner* — Chandrahas Patel
*Assistant Examiner* — Lan Huong Truong
(74) *Attorney, Agent, or Firm* — Foley & Lardner LLP

(57) ABSTRACT

A method and apparatus for allocating downlink resources and implementing downlink data reception in a broadband evolution system are disclosed in the present invention, so as to implement the allocation of resources in case of carrier resource expansion and implement the reception of downlink data in case of carrier resource expansion. A method for receiving downlink data includes that: emission bandwidth resources are divided into multiple frequency-domain Resource Blocks (RBs), and every frequency-domain Resource Block (RB) corresponds to an RB serial number, wherein the frequency-domain RBs corresponding to Release-8 (Rel-8) compatible frequency-domain resources are numbered in a numbering mode of a Long Term Evolution (LTE) system, and the frequency-domain RBs corresponding to incompatible frequency-domain resources are orderly numbered based on the largest serial number corresponding to the Rel-8 compatible frequency-domain resources; when receiving a downlink control signaling including RB serial numbers transferred from a network side, a broadband evolution terminal obtains frequency-domain RBs corresponding to the RB serial numbers, and can receive downlink data from the obtained frequency-domain RBs.

10 Claims, 6 Drawing Sheets

(56) References Cited

U.S. PATENT DOCUMENTS

| | | | |
|---|---|---|---|
| 8,406,182 B2 * | 3/2013 | Tiirola et al. | 370/329 |
| 2004/0042508 A1 * | 3/2004 | Menzel | 370/522 |
| 2009/0190538 A1 * | 7/2009 | Hasegawa | 370/329 |
| 2009/0323625 A1 * | 12/2009 | Lee et al. | 370/329 |
| 2011/0007695 A1 * | 1/2011 | Choi et al. | 370/329 |

FOREIGN PATENT DOCUMENTS

| | | |
|---|---|---|
| CN | 101527961 | 9/2009 |
| WO | WO-2010/078843 | 7/2010 |
| WO | WO-2010/114233 | 10/2010 |

* cited by examiner

METHOD AND DEVICE FOR ALLOCATING DOWNLINK RESOURCE AND RECEIVING DOWNLINK DATA

CROSS-REFERENCE TO RELATED APPLICATIONS

The present application is a US National Stage of International Application No. PCT/CN2010/002217, filed 30 Dec. 2010, designating the United States, and claiming priority to Chinese Patent Application No. 200910217503.3 filed 31 Dec. 2009. The contents of the foregoing applications are hereby incorporated herein by reference in their entireties.

FIELD OF THE INVENTION

The present invention relates to the field of communications and particularly to a method and device for allocating a downlink resource and receiving downlink data in a wideband evolution system.

BACKGROUND OF THE INVENTION

In a Long Term Evolution (LTE) Rel-8 system, a variety of system bandwidths are defined in the specification, as illustrated in FIG. 1, where a channel bandwidth is a total bandwidth occupied for the system, and a transmission bandwidth is an active bandwidth for transmission of a signal and in the unit of a Resource Block (RB) at the physical layer. Taking the downlink as an example, a direct current sub-carrier over which no signal is transmitted is centered in the channel bandwidth.

Six types of bandwidths as depicted in Table 1 are supported in the LTE Rel-8 standard.

TABLE 1

| Channel bandwidth $BW_{Channel}$ [MHz] | 1.4 | 3 | 5 | 10 | 15 | 20 |
|---|---|---|---|---|---|---|
| Configured transmission bandwidth/$N_{RB}$ | 6 | 15 | 25 | 50 | 75 | 100 |

For a direct current sub-carrier, the direct current sub-carrier is located at the intersection of two central RBs when there are an even number of RBs, e.g., 6 RBs, 50 RBs, 100 RBs, etc., in the transmission bandwidth; and the direct current sub-carrier is centered in a central RB when there are an odd number of RBs, e.g., 15 RBs, 25 RBs, 75 RBs, etc., in the transmission bandwidth, and since an RB consists of 12 sub-carriers in the LTE system, 6 sub-carriers of the central RB are located respectively on both sides of the direct current sub-carrier.

For an LTE-Advanced system, resources of a plurality of LTE component carriers have to be connected for use to support a larger channel bandwidth, e.g., 100 MHz, etc., than the LTE system, and in particular there are two schemes thereof in one of which a plurality of consecutive LTE component carriers are aggregated to provide the LTE-A with a larger transmission bandwidth and in the other of which a plurality of inconsecutive LTE component carriers are aggregated to provide the LTE-A with a larger transmission bandwidth. FIG. 2 is a schematic diagram of aggregated component carriers in an example of aggregated inconsecutive component carriers.

As preferred in an ongoing study of the standardization organization, it is recognized for a design of a system with aggregation of component carriers to keep a design over each component carrier as consistent with the LTE Rel-8 system as possible to thereby ensure that a user equipment of the LTE Rel-8 system can operate normally over each component carrier.

As established in an ongoing study on a demand of the LTE-A system, aggregation of at most 5 component carriers is supported, and a UE supports concurrent reception/transmission of data over at most 5 component carriers.

At present a method for utilizing discrete frequency-domain resources has been proposed in the industry as illustrated in FIG. 3, where there is a central bandwidth, i.e., a segment $B_0$, which is an Rel-8 compatible frequency-domain resource segment, in a frequency-domain resource section B, and a physical resource of the Rel-8 compatible frequency-domain resource segment can be shared between an LTE Rel-8 UE and an LTE-A UE; and a frequency-domain resource segment on both sides thereof, i.e., a segment B-$B_0$, is a non-backward compatible frequency-domain resource segment with a physical resource which can consist of consecutive frequency-domain resources or a plurality of inconsecutive frequency-domain resources. In this method, the several bandwidth values presented in Table 1 are accommodated by the extended channel bandwidth, i.e., the segment B.

In the foregoing carrier resource extension solution, the Rel-8 compatible frequency-domain resource segment is extended, and there remains an issue to be addressed of how to enable an LTE-A user equipment to normally access and use physical resources of a Rel-8 compatible frequency-domain resource segment and a non-backward compatible frequency-domain resource segment by using the extended resource.

SUMMARY OF THE INVENTION

Embodiments of the invention provide a method and device for receiving downlink data in a wideband evolution system to receive downlink data in the case of an extended carrier resource.

Embodiments of the invention provide a method and device for allocating a downlink resource in a wideband evolution system to allocate a resource in the case of an extended carrier resource.

An embodiment of the invention provides a method for receiving downlink data in a wideband evolution system with a transmission bandwidth resource including a Rel-8 compatible frequency-domain resource and a non-backward compatible frequency-domain resource, the method including:

dividing the transmission bandwidth resource into a plurality of frequency-domain resource blocks, each of which corresponds to a Resource Block (RB) number, wherein frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource, and the method further includes:

a wideband evolution user equipment, upon reception of downlink control signaling, including an RB number, transmitted from the network side, obtaining a frequency-domain resource block corresponding to the RB number in the downlink control signaling and receiving downlink data over the obtained frequency-domain resource block.

An embodiment of the invention provides a method for receiving downlink data in a wideband evolution system with a transmission bandwidth resource including a Rel-8 compatible frequency-domain resource and a non-backward compatible frequency-domain resource, the method including:

dividing the transmission bandwidth resource into a plurality of frequency-domain resource blocks, each of which corresponds to a Resource Block (RB) number, wherein the frequency-domain resource blocks are numbered sequentially in an order of ascending frequencies, and the method further includes:

a wideband evolution user equipment, upon reception of downlink control signaling, including an RB number, transmitted from the network side, obtaining a frequency-domain resource block corresponding to the RB number in the downlink control signaling and receiving downlink data over the obtained frequency-domain resource block.

An embodiment of the invention provides a method for allocating a downlink resource in a wideband evolution system with a transmission bandwidth resource including a Rel-8 compatible frequency-domain resource and a non-backward compatible frequency-domain resource, the method including:

dividing the transmission bandwidth resource into a plurality of frequency-domain resource blocks, each of which corresponds to a Resource Block (RB) number, wherein frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource, and the method further includes:

determining at the network side in allocation of a downlink frequency-domain resource block for a wideband evolution user equipment an RB number corresponding to the downlink frequency-domain resource block allocated for the wideband evolution user equipment, and transmitting the determined RB number to the wideband evolution user equipment.

An embodiment of the invention provides a method for allocating a downlink resource in a wideband evolution system with a transmission bandwidth resource including a Rel-8 compatible frequency-domain resource and a non-backward compatible frequency-domain resource, the method including:

dividing the transmission bandwidth resource into a plurality of frequency-domain resource blocks, for each of which a Resource Block (RB) number is set, wherein the frequency-domain resource blocks are numbered sequentially starting with the lowest frequency is a numbering scheme for a wideband evolution user equipment and the frequency-domain resource blocks are numbered in a numbering scheme of an LTE system for an LTE user equipment, and the method further includes:

determining at the network side the type of a user equipment for which a resource is to be allocated, allocating a downlink frequency-domain resource block for the user equipment according to the type of the user equipment, wherein the number of the allocated downlink frequency-domain resource block is determined in the numbering scheme for a wideband evolution user equipment if the user equipment is a wideband evolution user equipment or the number of the allocated downlink frequency-domain resource block is determined in the numbering scheme for an LTE user equipment if the user equipment is an LTE user equipment.

An embodiment of the invention provides a device for receiving downlink data in a wideband evolution system with a transmission bandwidth resource including a Rel-8 compatible frequency-domain resource and a non-backward compatible frequency-domain resource, the device including:

a storage unit configured to store numbering scheme information indicating that the transmission bandwidth resource is divided into a plurality of frequency-domain resource blocks, each of which corresponds to a Resource Block (RB) number, wherein frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource;

a first reception unit configured to receive downlink control signaling, including an RB number, transmitted from the network side;

a determination unit configured to obtain a frequency-domain resource block corresponding to the RB number in the downlink control signaling according to the numbering scheme information stored in the storage unit; and a second reception unit is configured to receive downlink data over the obtained frequency-domain resource block.

An embodiment of the invention provides a device for receiving downlink data in a wideband evolution system with a transmission bandwidth resource including a Rel-8 compatible frequency-domain resource and a non-backward compatible frequency-domain resource, the device including:

a storage unit configured to store numbering scheme information indicating that the transmission bandwidth resource is divided into a plurality of frequency-domain resource blocks, each of which corresponds to a Resource Block (RB) number, wherein the frequency-domain resource blocks are numbered in an order of ascending frequencies;

a first reception unit configured to receive downlink control signaling, including an RB number, transmitted from the network side;

a determination unit configured to obtain a frequency-domain resource block corresponding to the RB number in the downlink control signaling according to the numbering scheme information stored in the storage unit; and a second reception unit is configured to receive downlink data over the obtained frequency-domain resource block.

An embodiment of the invention provides a device for allocating a downlink resource in a wideband evolution system with a transmission bandwidth resource including a Rel-8 compatible frequency-domain resource and a non-backward compatible frequency-domain resource, the device including:

a storage unit configured to store numbering scheme information indicating that the transmission bandwidth resource is divided into a plurality of frequency-domain resource blocks, each of which corresponds to a Resource Block, RB, number, wherein frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource; and an allocation unit configured, in allocation of a downlink frequency-domain resource block to a wideband evolution user equipment, to determine an RB number corresponding to the downlink frequency-domain resource block allocated for the wideband evolution user equipment according to the numbering scheme information stored in the storage unit and to transmit the determined RB number to the wideband evolution user equipment.

An embodiment of the invention provides a device for allocating a downlink resource in a wideband evolution system with a transmission bandwidth resource including a Rel-8 compatible frequency-domain resource located in a middle frequency segment of the transmission bandwidth resource and a non-backward compatible frequency-domain resource, the device including:

a storage unit configured to store numbering scheme information indicating that the transmission bandwidth resource is divided into a plurality of frequency-domain resource blocks, for each of which a Resource Block (RB) number is set, wherein the frequency-domain resource blocks are numbered sequentially starting with the lowest frequency is a numbering scheme for a wideband evolution user equipment and the frequency-domain resource blocks are numbered in a numbering scheme of an LTE system for an LTE user equipment; and an allocation unit configured to determine the type of a user equipment for which a resource is to be allocated, to allocate a downlink frequency-domain resource block for the user equipment according to the type of the user equipment, wherein the number of the allocated downlink frequency-domain resource block is determined in the numbering scheme for a wideband evolution user equipment if the user equipment is a wideband evolution user equipment or the number of the allocated downlink frequency-domain resource block is determined in the numbering scheme for an LTE user equipment if the user equipment is an LTE user equipment.

In the embodiments of the invention, the transmission bandwidth resource is divided into a plurality of frequency-domain resource blocks which can be numbered in a numbering scheme in which each frequency-domain resource block corresponds to a Resource Block (RB) number, where the frequency-domain resource blocks corresponding to the Rel-8 compatible frequency-domain resource are numbered in a numbering scheme of an LTE system and the frequency-domain resource blocks corresponding to the non-backward compatible frequency-domain resource are numbered sequentially with reference to the largest one among the numbers corresponding to the Rel-8 compatible frequency-domain resource, or in another numbering scheme in which a resource for an LTE user equipment and a resource for a wideband evolution user equipment are numbered respectively in different numbering schemes for the different user equipments so that the frequency-domain resource blocks of the transmission bandwidth resource are numbered sequentially in an order of ascending frequencies for the wideband evolution user equipment and the original numbering scheme of the LTE system is used for the LTE user equipment. Upon reception of downlink control signaling, including an RB number, transmitted from the network side, the wideband evolution user equipment obtains the frequency-domain resource block corresponding to the RB number in the downlink control signaling and can receive downlink data over the obtained frequency-domain resource block.

DETAILED DESCRIPTION OF THE EMBODIMENTS

With extension of a carrier resource, a transmission bandwidth resource of a wideband evolution system includes a Rel-8 compatible frequency-domain resource and a non-backward compatible frequency-domain resource, and in order to receive downlink data in the case of the extended carrier resource, the transmission bandwidth resource can be divided into a plurality of frequency-domain resource blocks in an embodiment of the invention in a numbering scheme in which each frequency-domain resource block corresponds to a Resource Block (RB) number, where the frequency-domain resource blocks corresponding to the Rel-8 compatible frequency-domain resource are numbered in a numbering scheme of an LTE system and the frequency-domain resource blocks corresponding to the non-backward compatible frequency-domain resource are numbered sequentially with reference to the largest one among the numbers corresponding to the Rel-8 compatible frequency-domain resource, or in another numbering scheme in which a resource for an LTE user equipment and a resource for a wideband evolution user equipment are numbered respectively in different numbering schemes for the different user equipments so that the frequency-domain resource blocks of the transmission bandwidth resource are numbered sequentially in an order of ascending frequencies for the wideband evolution user equipment and the original numbering scheme of the LTE system is used for the LTE user equipment. Upon reception of downlink control signaling, including an RB number, transmitted from the network side, the wideband evolution user equipment obtains the frequency-domain resource block corresponding to the RB number in the downlink control signaling and can receive downlink data over the obtained frequency-domain resource block.

The wideband evolution system can be an LTE-A system or another wideband system developed based upon the LTE system. A technical solution of the invention will be described below taking a wideband evolution system being an LTE-A system as an example.

Figure 1:
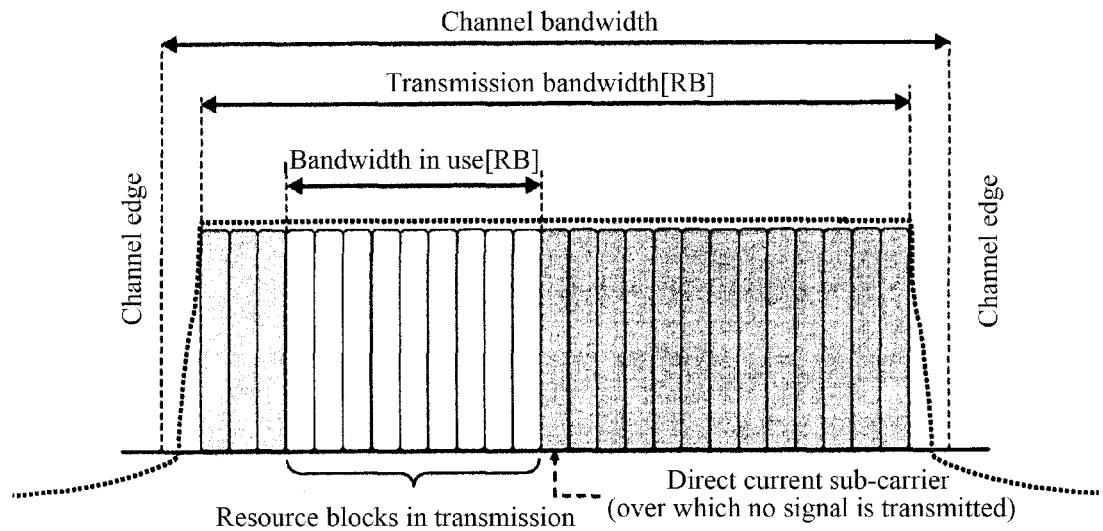
FIG. 1 is a schematic diagram of a variety of system bandwidths defined in an LTE Rel-8 system.
Figure 2:
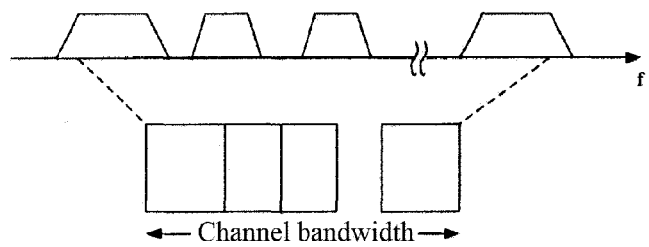
FIG. 2 is a schematic diagram of aggregated inconsecutive component carriers.
Figure 3:
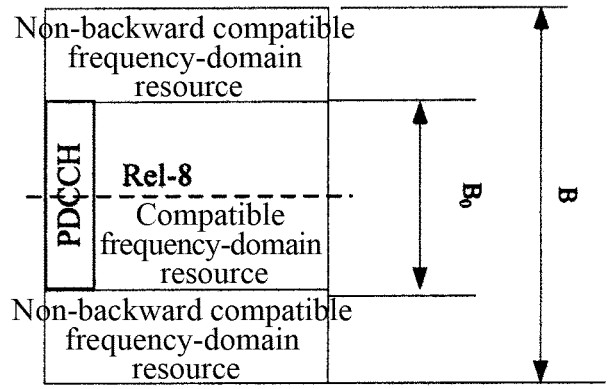
FIG. 3 is a schematic diagram of a method for utilizing discrete frequency-domain resources.
Figure 4:
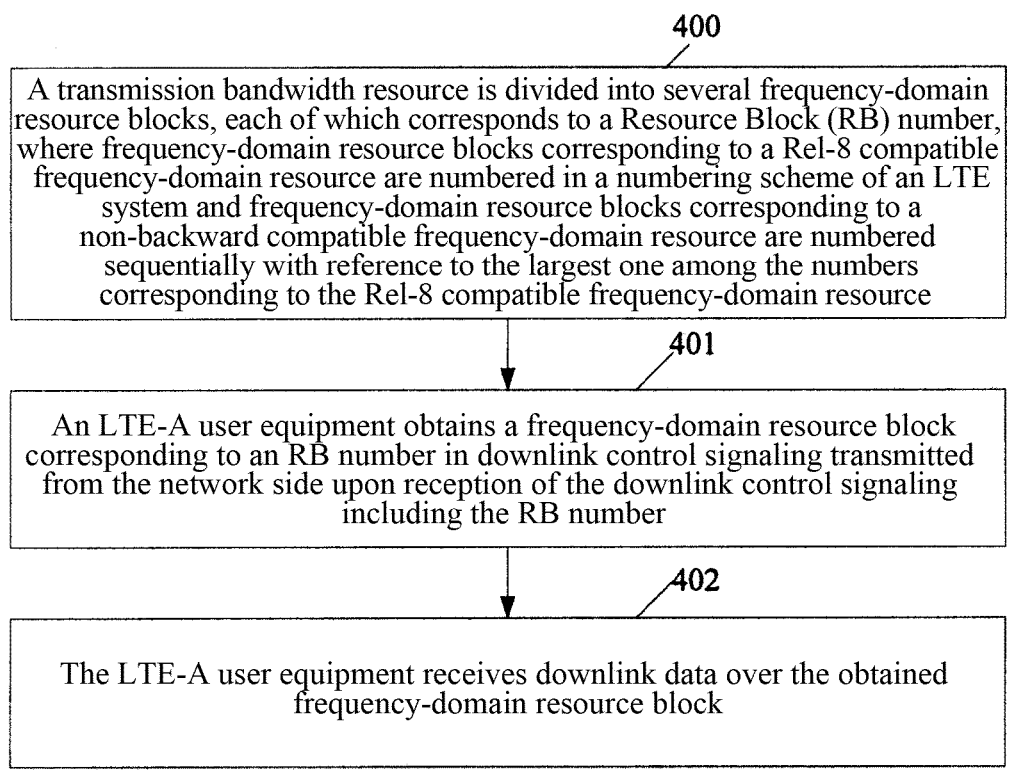
FIG. 4 is a schematic flow diagram of a method for receiving downlink data in an LTE-A system according to an embodiment of the invention.

Referring to FIG. 4, a method for receiving downlink data in an LTE-A system according to an embodiment of the invention includes the following steps.

Step 400: A transmission bandwidth resource, including a Rel-8 compatible frequency-domain resource and a non-backward compatible frequency-domain resource, of the LTE-A system is divided into a plurality of frequency-domain resource blocks, each of which corresponds to a Resource Block (RB) number, where frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource. In an implementation, a correspondence relationship between the RB numbers and the frequency-domain resource blocks can be set in the step 400.

Step 401: An LTE-A user equipment obtains a frequency-domain resource block corresponding to an RB number in downlink control signaling transmitted from the network side upon reception of the downlink control signaling including the RB number.

Step 402: The LTE-A user equipment receives downlink data over the obtained frequency-domain resource block.

The Rel-8 compatible frequency-domain resource is located in a middle frequency segment of the transmission bandwidth resource, and the non-backward compatible frequency-domain resource is located at a low frequency segment and/or a high frequency segment of the transmission bandwidth resource.

If the Rel-8 compatible frequency-domain resource is located in the middle frequency segment of the transmission bandwidth resource and the non-backward compatible frequency-domain resource is located at the low frequency and high frequency segments of the transmission bandwidth resource, the frequency-domain resource blocks corresponding to the non-backward compatible frequency-domain resource can be numbered sequentially with reference to the largest one among the numbers corresponding to the Rel-8 compatible frequency-domain resource in the step 400 as follows: frequency-domain resource blocks corresponding to a high frequency segment of the non-backward compatible frequency-domain resource are numbered sequentially in an order of ascending frequencies with reference to the largest one among the numbers corresponding to the Rel-8 compatible frequency-domain resource, and then frequency-domain resource blocks corresponding to a low frequency segment of the non-backward compatible frequency-domain resource are numbered sequentially in an order of ascending frequencies with reference to the largest one among the numbers of the frequency-domain resource blocks corresponding to the high frequency segment of the non-backward compatible frequency-domain resource.

If the Rel-8 compatible frequency-domain resource is located in the middle frequency segment of the transmission bandwidth resource and the non-backward compatible frequency-domain resource is located at the low frequency and high frequency segments of the transmission bandwidth resource, the frequency-domain resource blocks corresponding to the non-backward compatible frequency-domain resource can be numbered sequentially with reference to the largest one among the numbers corresponding to the Rel-8 compatible frequency-domain resource in the step 400 as follows: frequency-domain resource blocks corresponding to a low frequency segment of the non-backward compatible frequency-domain resource are numbered sequentially in an order of ascending frequencies with reference to the largest one among the numbers corresponding to the Rel-8 compatible frequency-domain resource, and then frequency-domain resource blocks corresponding to a high frequency segment of the non-backward compatible frequency-domain resource are numbered sequentially in an order of ascending frequencies with reference to the largest one among the numbers of the frequency-domain resource blocks corresponding to the low frequency segment of the non-backward compatible frequency-domain resource.

If both the transmission bandwidth resource of the LTE-A system and the Rel-8 compatible frequency-domain resource are dividable into an even number of frequency-domain resource blocks or both the transmission bandwidth resource of the LTE-A system and the Rel-8 compatible frequency-domain resource are dividable into an odd number of frequency-domain resource blocks, all the bandwidth resource of the transmission bandwidth resource can be divided into a plurality of frequency-domain resource blocks.

If the transmission bandwidth resource of the LTE-A system is dividable into an even number of frequency-domain resource blocks and the Rel-8 compatible frequency-domain resource is dividable into an odd number of frequency-domain resource blocks, or the transmission bandwidth resource of the LTE-A system is dividable into an odd number of frequency-domain resource blocks and the Rel-8 compatible frequency-domain resource is dividable into an even number of frequency-domain resource blocks, a part of the bandwidth resource of the transmission bandwidth resource can be divided into a plurality of frequency-domain resource blocks.

If the Rel-8 compatible frequency-domain resource is located in the middle frequency segment of the transmission bandwidth resource and the non-backward compatible frequency-domain resource is located at the low frequency and high frequency segments of the transmission bandwidth resource, a physical resource with the size of half a frequency-domain resource block can be symmetrically reserved respectively in a high frequency segment and a low frequency segment of the non-backward compatible frequency-domain resource, and the high frequency segment and the low frequency segment, reserved the physical resources with the size of half a frequency-domain resource block, of the non-backward compatible frequency-domain resource can be divided respectively into frequency-domain resource blocks while no data is transmitted over the reserved physical resources.

If the Rel-8 compatible frequency-domain resource is located in the middle frequency segment of the transmission bandwidth resource and the non-backward compatible frequency-domain resource is located at the low frequency and high frequency segments of the transmission bandwidth resource, a physical resource with the size of half a frequency-domain resource block can be reserved starting with the highest frequency in the high frequency segment of the non-backward compatible frequency-domain resource, and a physical resource with the size of half a frequency-domain resource block can be reserved starting with the lowest frequency in the low frequency segment of the non-backward compatible frequency-domain resource. Alternatively, a physical resource with the size of half a frequency-domain resource block can be reserved starting with the lowest frequency in the high frequency segment of the non-backward compatible frequency-domain resource, and a physical resource with the size of half a frequency-domain resource block can be reserved starting with the highest frequency in the low frequency segment of the non-backward compatible frequency-domain resource.

Figure 5:
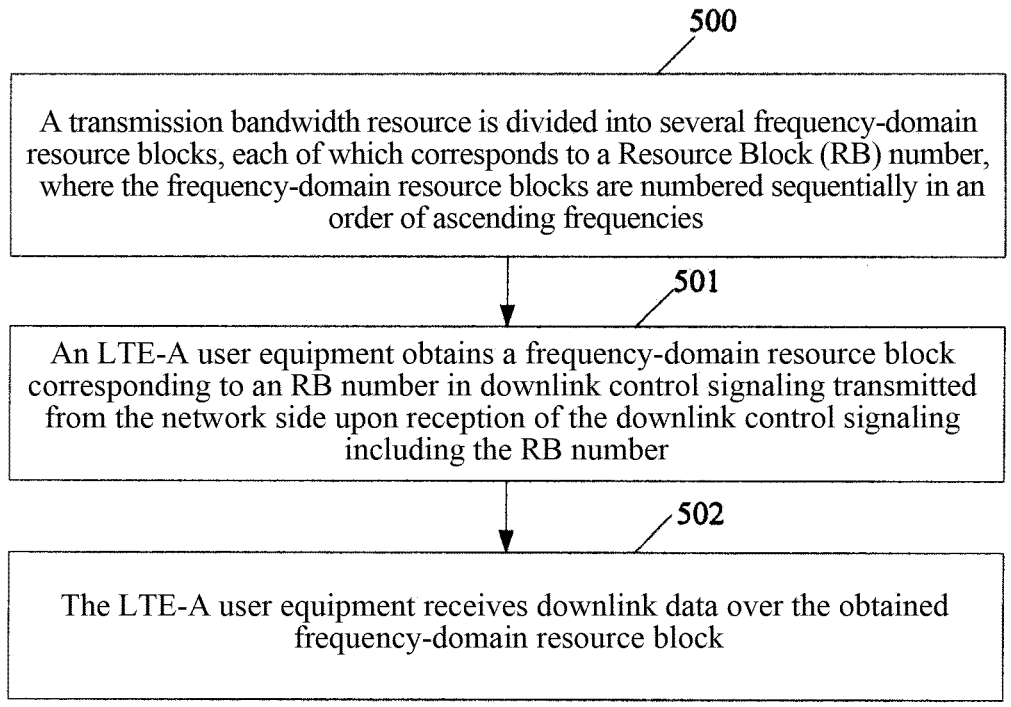
FIG. 5 is a schematic flow diagram of another method for receiving downlink data in an LTE-A system according to an embodiment of the invention.

Referring to FIG. 5, another method for receiving downlink data in an LTE-A system according to an embodiment of the invention includes the following steps.

Step 500: A transmission bandwidth resource, including a Rel-8 compatible frequency-domain resource and a non-backward compatible frequency-domain resource, of the LTE-A system is divided into a plurality of frequency-domain resource blocks, each of which corresponds to a Resource Block (RB) number, where the frequency-domain resource blocks are numbered sequentially in an order of ascending frequencies. In an implementation, a correspondence relationship between the RB numbers and the frequency-domain resource blocks can be set and stored in the step 500.

Step 501: An LTE-A user equipment obtains a frequency-domain resource block corresponding to an RB number in downlink control signaling transmitted from the network side upon reception of the downlink control signaling including the RB number.

Step 502: The LTE-A user equipment receives downlink data over the obtained frequency-domain resource block.

In the step 500, if both the transmission bandwidth resource of the LTE-A system and the Rel-8 compatible frequency-domain resource are dividable into an even number of frequency-domain resource blocks or both the transmission bandwidth resource of the LTE-A system and the Rel-8 compatible frequency-domain resource are dividable into an odd number of frequency-domain resource blocks, all the bandwidth resource of the transmission bandwidth resource can be divided into a plurality of frequency-domain resource blocks.

In the step 500, if the transmission bandwidth resource of the LTE-A system is dividable into an even number of frequency-domain resource blocks and the Rel-8 compatible frequency-domain resource is dividable into an odd number of frequency-domain resource blocks, or the transmission bandwidth resource of the LTE-A system is dividable into an odd number of frequency-domain resource blocks and the Rel-8 compatible frequency-domain resource is dividable into an even number of frequency-domain resource blocks, a part of the bandwidth resource of the transmission bandwidth resource can be divided into a plurality of frequency-domain resource blocks.

If the Rel-8 compatible frequency-domain resource is located in a middle frequency segment of the transmission bandwidth resource and the non-backward compatible frequency-domain resource is located at low frequency and high frequency segments of the transmission bandwidth resource, a part of the bandwidth resource of the transmission bandwidth resource can be divided into a plurality of frequency-domain resource blocks as follows: a physical resource with the size of half a frequency-domain resource block can be symmetrically reserved respectively in a high frequency segment and a low frequency segment of the non-backward compatible frequency-domain resource, and the high frequency segment and the low frequency segment, reserved physical resources with the size of half a frequency-domain resource block, of the non-backward compatible frequency-domain resource can be divided respectively into frequency-domain resource blocks while no data is transmitted over the reserved physical resources.

If the Rel-8 compatible frequency-domain resource is located in the middle frequency segment of the transmission bandwidth resource and the non-backward compatible frequency-domain resource is located at the low frequency and high frequency segments of the transmission bandwidth resource, a physical resource with the size of half a frequency-domain resource block can be reserved starting with the highest frequency in the high frequency segment of the non-backward compatible frequency-domain resource, and a physical resource with the size of half a frequency-domain resource block can be reserved starting with the lowest frequency in the low frequency segment of the non-backward compatible frequency-domain resource. Alternatively, a physical resource with the size of half a frequency-domain resource block can be reserved starting with the lowest frequency in the high frequency segment of the non-backward compatible frequency-domain resource, and a physical resource with the size of half a frequency-domain resource block can be reserved starting with the highest frequency in the low frequency segment of the non-backward compatible frequency-domain resource.

Figure 6:
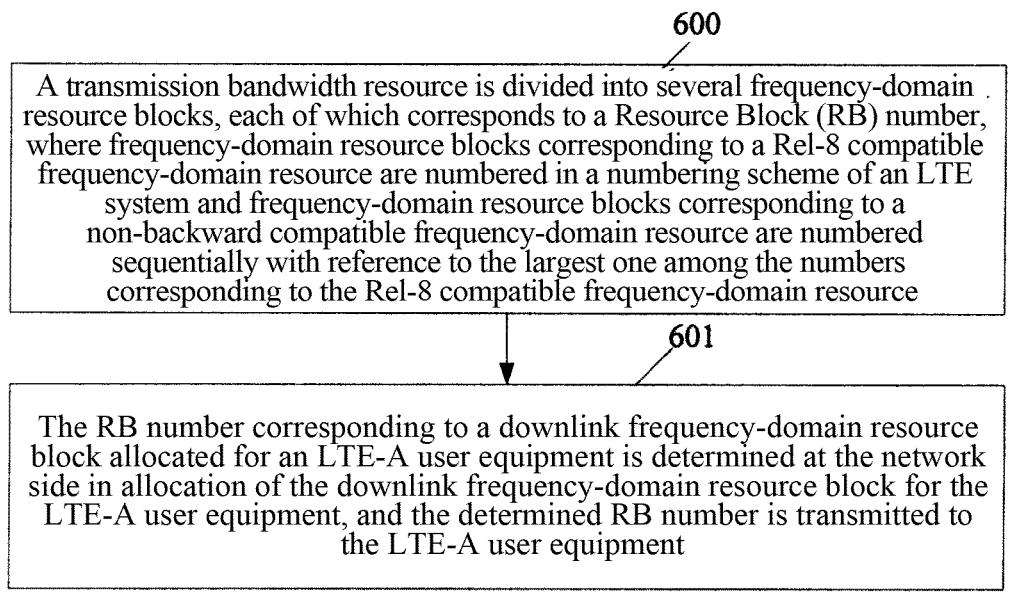
FIG. 6 is a schematic flow diagram of a method for allocating a downlink resource in an LTE-A system according to an embodiment of the invention.

In connection with the embodiment illustrated in FIG. 4, frequency-domain resource blocks are numbered at the network side in the same numbering scheme so that a resource can be allocated at the network side thus enabling correct parsing at the side of a user equipment. Referring to FIG. 6, a method for allocating a downlink resource in an LTE-A system according to an embodiment of the invention includes the following steps.

Step 600: A transmission bandwidth resource, including a Rel-8 compatible frequency-domain resource and a non-backward compatible frequency-domain resource, of the LTE-A system is divided into a plurality of frequency-domain resource blocks, each of which corresponds to a Resource Block (RB) number, where frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource.

Step 601: An RB number corresponding to a downlink frequency-domain resource block allocated for an LTE-A user equipment is determined at the network side in allocation of the downlink frequency-domain resource block for the LTE-A user equipment, and the determined RB number is transmitted to the LTE-A user equipment.

The Rel-8 compatible frequency-domain resource is located in a middle frequency segment of the transmission bandwidth resource, and the non-backward compatible frequency-domain resource is located at a low frequency segment and/or a high frequency segment of the transmission bandwidth resource.

If the Rel-8 compatible frequency-domain resource is located in the middle frequency segment of the transmission bandwidth resource and the non-backward compatible frequency-domain resource is located at the low frequency and high frequency segments of the transmission bandwidth resource, the frequency-domain resource blocks corresponding to the non-backward compatible frequency-domain resource can be numbered sequentially with reference to the largest one among the numbers corresponding to the Rel-8 compatible frequency-domain resource as follows: frequency-domain resource blocks corresponding to a high frequency segment of the non-backward compatible frequency-domain resource are numbered sequentially in an order of ascending frequencies with reference to the largest one among the numbers corresponding to the Rel-8 compatible frequency-domain resource, and then frequency-domain resource blocks corresponding to a low frequency segment of the non-backward compatible frequency-domain resource are numbered sequentially in an order of ascending frequencies with reference to the largest one among the numbers of the frequency-domain resource blocks corresponding to the high frequency segment of the non-backward compatible frequency-domain resource. Alternatively, frequency-domain resource blocks corresponding to a low frequency segment of the non-backward compatible frequency-domain resource are numbered sequentially in an order of ascending frequencies with reference to the largest one among the numbers corresponding to the Rel-8 compatible frequency-domain resource, and then frequency-domain resource blocks corresponding to a high frequency segment of the non-backward compatible frequency-domain resource are numbered sequentially in an order of ascending frequencies with reference to the largest one among the numbers of the frequency-domain resource blocks corresponding to the low frequency segment of the non-backward compatible frequency-domain resource.

If both the transmission bandwidth resource of the LTE-A system and the Rel-8 compatible frequency-domain resource are dividable into an even number of frequency-domain resource blocks or both the transmission bandwidth resource of the LTE-A system and the Rel-8 compatible frequency-domain resource are dividable into an odd number of frequency-domain resource blocks, all the bandwidth resource of the transmission bandwidth resource can be divided into a plurality of frequency-domain resource blocks.

If the transmission bandwidth resource of the LTE-A system is dividable into an even number of frequency-domain resource blocks and the Rel-8 compatible frequency-domain resource is dividable into an odd number of frequency-domain resource blocks, or the transmission bandwidth resource of the LTE-A system is dividable into an odd number of frequency-domain resource blocks and the Rel-8 compatible frequency-domain resource is dividable into an even number of frequency-domain resource blocks, a part of the bandwidth resource of the transmission bandwidth resource can be divided into a plurality of frequency-domain resource blocks. In an implementation, a physical resource with the size of half a frequency-domain resource block can be symmetrically reserved respectively in a high frequency segment and a low frequency segment of the non-backward compatible frequency-domain resource, and the high frequency segment and the low frequency segment, reserved physical resources with the size of half a frequency-domain resource block, of the non-backward compatible frequency-domain resource can be divided respectively into frequency-domain resource blocks while no data is transmitted over the reserved physical resources. For example, a physical resource with the size of half a frequency-domain resource block is reserved starting with the highest frequency in the high frequency segment of the non-backward compatible frequency-domain resource, and a physical resource with the size of half a frequency-domain resource block is reserved starting with the lowest frequency in the low frequency segment of the non-backward compatible frequency-domain resource. In another example, a physical resource with the size of half a frequency-domain resource block is reserved starting with the lowest frequency in the high frequency segment of the non-backward compatible frequency-domain resource, and a physical resource with the size of half a frequency-domain resource block is reserved starting with the highest frequency in the low frequency segment of the non-backward compatible frequency-domain resource.

Figure 7:
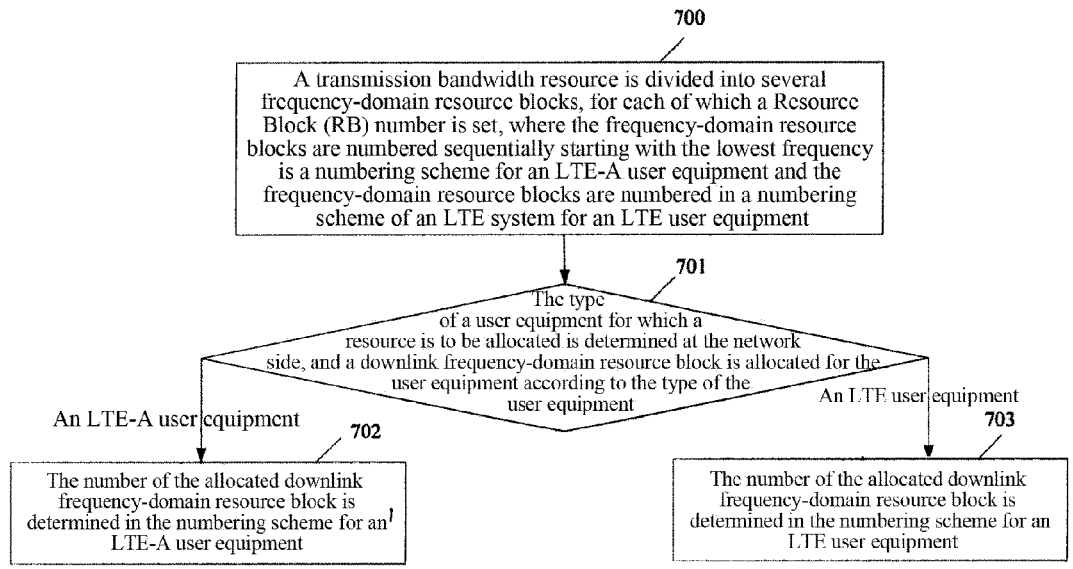
FIG. 7 is a schematic flow diagram of another method for allocating a downlink resource in an LTE-A system according to an embodiment of the invention.

In connection with the embodiment illustrated in FIG. 5, frequency-domain resource blocks are numbered at the network side in the same numbering scheme so that a resource can be allocated at the network side thus enabling correct parsing at the side of a user equipment. At the network side, the different numbering schemes are used for the different user equipments, and the different user equipments parse the resource allocated at the network side by using the corresponding scheme. Referring to FIG. 7, a method for allocating a downlink resource in an LTE-A system according to an embodiment of the invention is as follows.

Step 700: A transmission bandwidth resource, including a Rel-8 compatible frequency-domain resource and a non-backward compatible frequency-domain resource, of the LTE-A system is divided into a plurality of frequency-domain resource blocks, for each of which a Resource Block (RB) number is set, where the frequency-domain resource blocks are numbered sequentially starting with the lowest frequency is a numbering scheme for an LTE-A user equipment and the frequency-domain resource blocks are numbered in a numbering scheme of an LTE system for an LTE user equipment. Reference can be made to 3GPP TS36.211 v900 for the numbering scheme of the LTE system as mentioned herein.

Step 701: The type of a user equipment for which a resource is to be allocated is determined at the network side, and a downlink frequency-domain resource block is allocated for the user equipment according to the type of the user equipment, where the flow goes to the step 702 if the user equipment is an LTE-A user equipment or the step 703 if the user equipment is an LTE user equipment.

Step 702: The number of the allocated downlink frequency-domain resource block is determined in the numbering scheme for an LTE-A user equipment.

Step 703: The number of the allocated downlink frequency-domain resource block is determined in the numbering scheme for an LTE user equipment.

In the step 700, if both the transmission bandwidth resource of the LTE-A system and the Rel-8 compatible frequency-domain resource are dividable into an even number of frequency-domain resource blocks or both the transmission bandwidth resource of the LTE-A system and the Rel-8 compatible frequency-domain resource are dividable into an odd number of frequency-domain resource blocks, all the bandwidth resource of the transmission bandwidth resource can be divided into a plurality of frequency-domain resource blocks.

If the transmission bandwidth resource of the LTE-A system is dividable into an even number of frequency-domain resource blocks and the Rel-8 compatible frequency-domain resource is dividable into an odd number of frequency-domain resource blocks, or the transmission bandwidth resource of the LTE-A system is dividable into an odd number of frequency-domain resource blocks and the Rel-8 compatible frequency-domain resource is dividable into an even number of frequency-domain resource blocks, a part of the bandwidth resource of the transmission bandwidth resource can be divided into a plurality of frequency-domain resource blocks.

If the Rel-8 compatible frequency-domain resource is located in a middle frequency segment of the transmission bandwidth resource and the non-backward compatible frequency-domain resource is located at low frequency and high frequency segments of the transmission bandwidth resource, a part of the bandwidth resource of the transmission bandwidth resource can be divided into a plurality of frequency-domain resource blocks as follows: a physical resource with the size of half a frequency-domain resource block is symmetrically reserved respectively in a high frequency segment and a low frequency segment of the non-backward compatible frequency-domain resource, and the high frequency segment and the low frequency segment, reserved physical resources with the size of half a frequency-domain resource block, of the non-backward compatible frequency-domain resource are divided respectively into frequency-domain resource blocks while no data is transmitted over the reserved physical resources. For example, a physical resource with the size of half a frequency-domain resource block is reserved starting with the highest frequency in the high frequency segment of the non-backward compatible frequency-domain resource, and a physical resource with the size of half a frequency-domain resource block is reserved starting with the lowest frequency in the low frequency segment of the non-backward compatible frequency-domain resource. In another example, a physical resource with the size of half a frequency-domain resource block is reserved starting with the lowest frequency in the high frequency segment of the non-backward compatible frequency-domain resource, and a physical resource with the size of half a frequency-domain resource block is reserved starting with the highest frequency in the low frequency segment of the non-backward compatible frequency-domain resource.

In correspondence to the embodiment illustrated in FIG. 4, an embodiment of the invention provides a device for receiving downlink data in an LTE-A system with a transmission bandwidth resource including a Rel-8 compatible frequency-domain resource and a non-backward compatible frequency-domain resource, and the device includes a storage unit, a first reception unit, a determination unit and a second reception unit.

The storage unit is configured to store numbering scheme information indicating that the transmission bandwidth resource is divided into a plurality of frequency-domain resource blocks, each of which corresponds to a Resource Block (RB) number, where frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource; the first reception unit is configured to receive downlink control signaling, including an RB number, transmitted from the network side; the determination unit is configured to obtain a frequency-domain resource block corresponding to the RB number in the downlink control signaling according to the numbering scheme information stored in the storage unit; and the second reception unit is configured to receive downlink data over the obtained frequency-domain resource block.

In correspondence to the embodiment illustrated in FIG. 5, an embodiment of the invention provides a device for receiving downlink data in an LTE-A system with a transmission bandwidth resource including a Rel-8 compatible frequency-domain resource and a non-backward compatible frequency-domain resource, and the device includes a storage unit, a first reception unit, a determination unit and a second reception unit.

The storage unit is configured to store numbering scheme information indicating that the transmission bandwidth resource is divided into a plurality of frequency-domain resource blocks, each of which corresponds to a Resource Block (RB) number, where the frequency-domain resource blocks are numbered sequentially in an order of ascending frequencies; the first reception unit is configured to receive downlink control signaling, including an RB number, transmitted from the network side; the determination unit is configured to obtain a frequency-domain resource block corresponding to the RB number in the downlink control signaling according to the numbering scheme information stored in the storage unit; and the second reception unit is configured to receive downlink data over the obtained frequency-domain resource block.

In correspondence to the embodiment illustrated in FIG. 6, an embodiment of the invention provides a device for allocating a downlink resource in an LTE-A system with a transmission bandwidth resource including a Rel-8 compatible frequency-domain resource and a non-backward compatible frequency-domain resource, and the device includes a storage unit and an allocation unit.

The storage unit is configured to store numbering scheme information indicating that the transmission bandwidth resource is divided into a plurality of frequency-domain resource blocks, each of which corresponds to a Resource Block (RB) number, where frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource; and the allocation unit is configured, in allocation of a downlink frequency-domain resource block to an LTE-A user equipment, to determine an RB number corresponding to the downlink frequency-domain resource block allocated for the LTE-A user equipment according to the numbering scheme information stored in the storage unit and to transmit the determined RB number to the LTE-A user equipment.

In correspondence to the embodiment illustrated in FIG. 7, an embodiment of the invention provides a device for allocating a downlink resource in an LTE-A system with a transmission bandwidth resource including a Rel-8 compatible frequency-domain resource and a non-backward compatible frequency-domain resource, and the device includes a storage unit and an allocation unit.

The storage unit is configured to store numbering scheme information indicating that the transmission bandwidth resource is divided into a plurality of frequency-domain resource blocks, for each of which a Resource Block (RB) number is set, where the frequency-domain resource blocks are numbered sequentially starting with the lowest frequency is a numbering scheme for an LTE-A user equipment and the frequency-domain resource blocks are numbered in a numbering scheme of an LTE system for an LTE user equipment; and the allocation unit is configured to determine the type of a user equipment for which a resource is to be allocated, and to allocate a downlink frequency-domain resource block for the user equipment according to the type of the user equipment, where the number of the allocated downlink frequency-domain resource block is determined in the numbering scheme for an LTE-A user equipment if the user equipment is an LTE-A user equipment or the number of the allocated downlink frequency-domain resource block is determined in the numbering scheme for an LTE user equipment if the user equipment is an LTE user equipment.

The numbering schemes in the embodiments of the invention will be exemplified below.

When the Rel-8 compatible frequency-domain resource has a bandwidth of an even number of RBs and the extended resource also has a transmission bandwidth of an even number of RBs, or when the Rel-8 compatible frequency-domain resource has a bandwidth of an odd number of RBs and the extended resource also has a transmission bandwidth of an odd number of RBs, the boundaries of the RBs of the non-backward compatible frequency-domain resource segment are aligned with the boundaries of the RBs of the Rel-8 compatible frequency-domain resource segment, and the direct current sub-carrier of the extended carrier remains at the same location as the direct current sub-carrier of the original Rel-8 compatible frequency-domain resource segment, and in this case there are two numbering schemes for all the RBs in the system.

Figure 8:
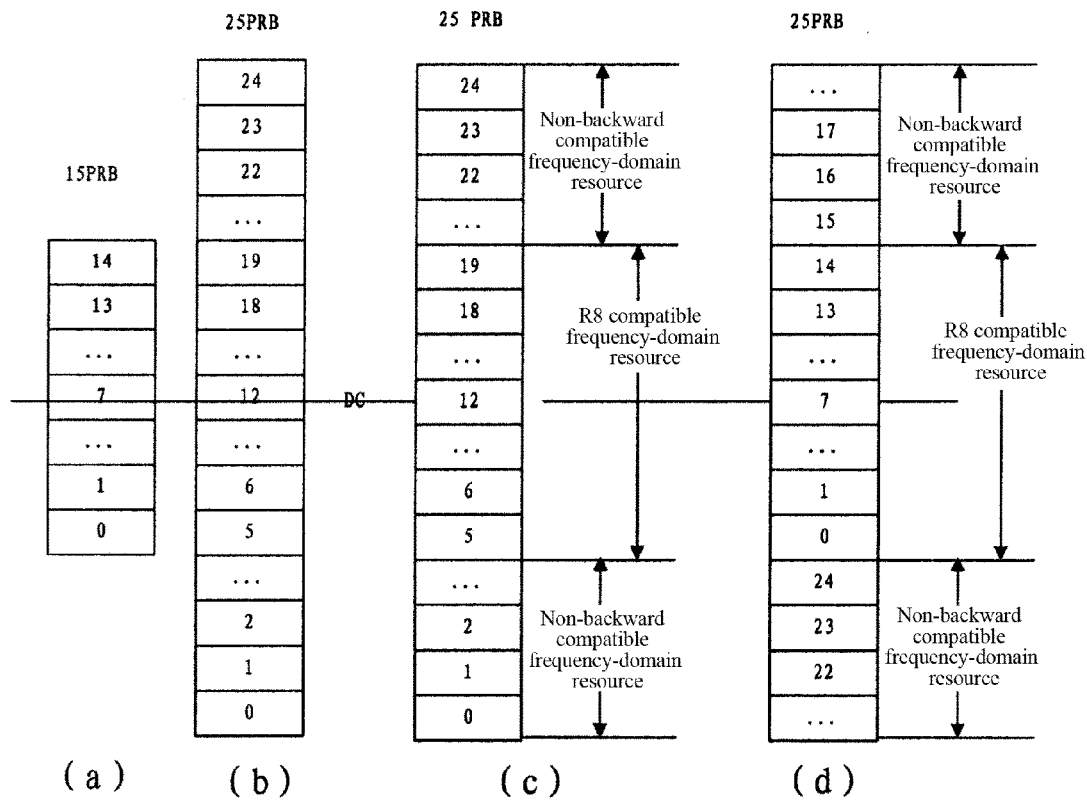
FIG. 8 is a schematic diagram of a correspondence relationship between RB numbers and frequency-domain resource blocks in a carrier resource extension solution according to an embodiment of the invention.

FIG. 8 illustrates four sections (a), (b), (c) and (d), where the section (a) is schematic of the Rel-8 frequency-domain resource of 15 RBs; the section (b) is schematic of the Rel-8 frequency-domain resource of 15 RBs being extended to 25 RBs with a numbering scheme being a sequential numbering scheme; the section (c) is schematic of the numbering scheme in which sequential numbering is performed for the extended transmission bandwidth, where renumbering is performed in the Rel-8 compatible frequency-domain resource segment and the non-backward compatible frequency-domain resource segment, and such numbering can be adopted for an LTE-A user equipment in an LTE-A system, and the original numbering scheme can be adopted for an LTE user equipment, i.e., as illustrated in the section (a); and in the section (d), the original numbering scheme is adopted in the Rel-8 compatible frequency-domain resource segment and sequential numbering with reference to the largest one among the numbers in the Rel-8 compatible frequency-domain resource segment is performed in the non-backward compatible frequency-domain resource segment of the extended transmission bandwidth, and as illustrated, the largest one among the numbers in the Rel-8 compatible frequency-domain resource segment is 14, so sequential numbering can proceed with reference to 14 in a high frequency segment of the non-backward compatible frequency-domain resource segment, that is, starting with 15, and then in a low frequency segment of the non-backward compatible frequency-domain resource segment.

In a first example, the RBs throughout the transmission bandwidth are numbered sequentially in an order of ascending frequencies in the numbering scheme illustrated in the section (c) for an LTE-A user equipment, and the RBs in the Rel-8 compatible frequency-domain resource segment are numbered in the original scheme, i.e., the numbering scheme illustrated in the section (a), for an LTE user equipment. In this case, the two numbering schemes will be stored at the network side, and the same RB will appear as being numbered differently to an LTE user equipment and an LTE-A user equipment operating in the Rel-8 compatible frequency-domain resource segment, for example, the RB no. 5 appearing to the LTE-A user equipment appears the RB no. 0 to the LTE user equipment.

In a second example, the numbering scheme illustrated in the section (d) is adopted, that is, firstly the RBs in the Rel-8 compatible frequency-domain resource segment are numbered in an order of ascending frequencies, and then the RBs in the non-backward compatible frequency-domain resource segment are numbered. In this case, an RB appears as being numbered identically to an LTE user equipment and an LTE-A user equipment operating in the Rel-8 compatible frequency-domain resource segment.

When the Rel-8 compatible frequency-domain resource has a bandwidth of an even number of RBs and the extended resource has a transmission bandwidth of an odd number of RBs, or when the Rel-8 compatible frequency-domain resource has a bandwidth of an odd number of RBs and the extended resource has a transmission bandwidth of an even number of RBs, the boundaries of the RBs of the non-backward compatible frequency-domain resource segment will be translated by 6 sub-carriers (half an RB) to be aligned with the boundaries of the RBs of the Rel-8 compatible frequency-domain resource segment.

Figure 9:
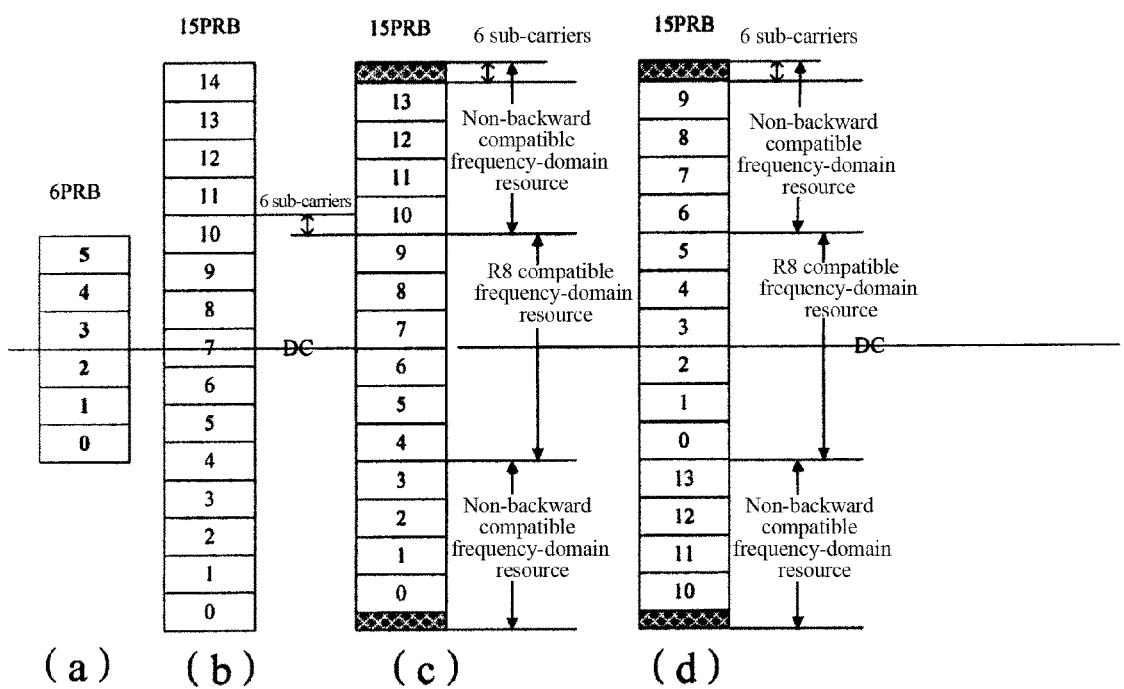
FIG. 9 is a schematic diagram of a correspondence relationship between RB numbers and frequency-domain resource blocks in another carrier resource extension solution according to an embodiment of the invention.
Figure 10:
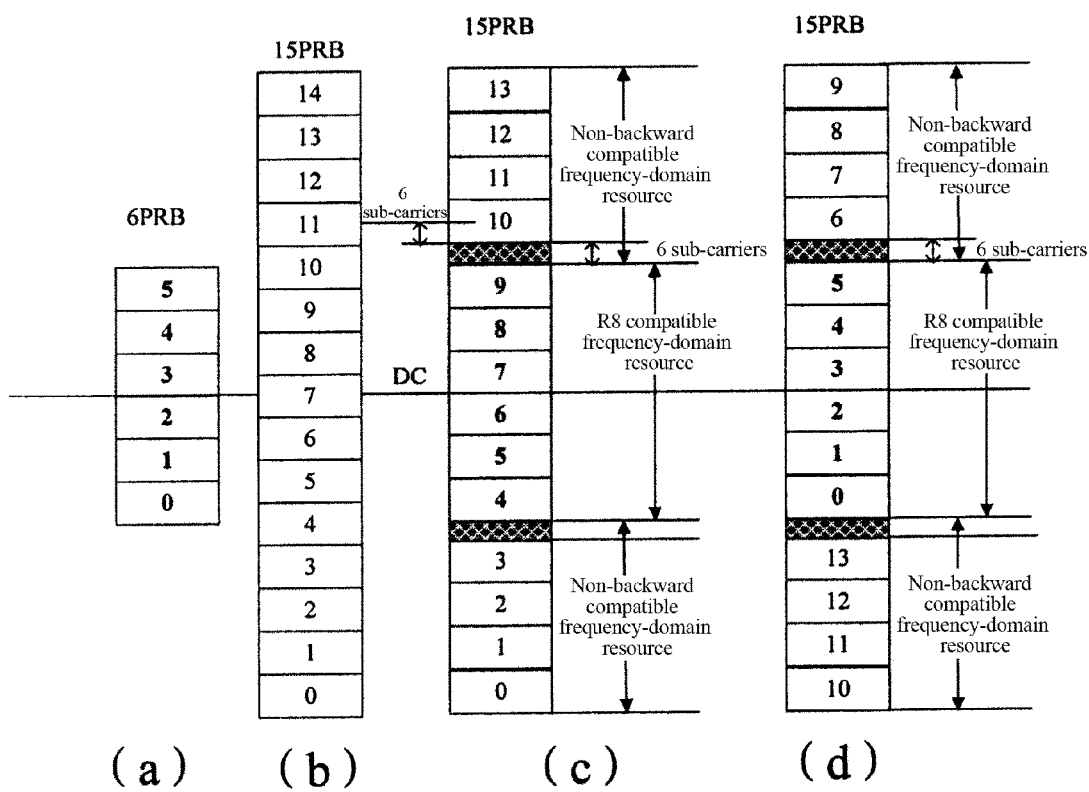
FIG. 10 is a schematic diagram of a correspondence relationship between RB numbers and frequency-domain resource blocks in a further carrier resource extension solution according to an embodiment of the invention.

FIG. 9 and FIG. 10 illustrate schematic diagrams of the Rel-8 compatible frequency-domain resource of 6 RBs being extended to the transmission bandwidth of 15 RBs, where the section (a) is schematic of a numbering scheme of the Rel-8 compatible frequency-domain resource, and the section (b) is schematic of the extended transmission bandwidth including all the RBs which are numbered sequentially. As defined in the Rel-8 specification, the direct current sub-carrier of the frequency-domain resource including 6 RBs is located between two central RBs and the direct current sub-carrier of the frequency-domain resource including 15 RBs is centered in a central RB, so the RBs in the extended resource segment will be translated by 6 sub-carriers to keep aligned with the Rel-8 compatible frequency-domain resource segment, thereby ensuring that the location of the physical resource and the location of the direct current sub-carrier appear as they are to an LTE user equipment. There are two possible different translation schemes as in the section (c) and the section (d) in FIG. 9 and in the section (c) and the section (d) in FIG. 10.

As illustrated in FIG. 9, the boundary of the RBs in the non-backward compatible frequency-domain resource segment at the high frequency side is translated by 6 sub-carriers to the low frequency side with reference to the central Rel-8 compatible frequency-domain resource segment, and no data will be transmitted over these 6 sub-carriers acting as a reserved resource; and also the boundary of the RBs in the non-backward compatible frequency-domain resource segment at the low frequency side is translated by 6 sub-carriers to the high frequency side with reference to the central Rel-8 compatible frequency-domain resource segment, and no data will be transmitted over these 6 sub-carriers acting as a reserved resource. In this case the 6 idle sub-carriers reserved on both sides of the extended carrier can be used as a frequency guard band of the system, or some special signals of the LTE-A system can be transmitted thereover.

As illustrated in FIG. 10, the boundary of the RBs in the non-backward compatible frequency-domain resource segment at the high frequency side is translated by 6 sub-carriers to the high frequency side with reference to the central Rel-8 compatible frequency-domain resource segment; and also the boundary of the RBs in the non-backward compatible frequency-domain resource segment at the low frequency side is translated by 6 sub-carriers to the low frequency side with reference to the central Rel-8 compatible frequency-domain resource segment. In this case the 6 idle sub-carriers reserved respectively between both sides of the Rel-8 compatible frequency-domain resource segment and the non-backward compatible frequency-domain resource segment of the extended carrier can be used as inactive sub-carriers over which no signal is transmitted, or some special signals of the LTE-A system can be transmitted thereover.

In the section (c) of FIG. 9 and FIG. 10, the RBs throughout the transmission bandwidth are numbered sequentially in an order of ascending frequencies for an LTE-A user equipment as described above. In this case, the same RB will appear as being numbered differently to an LTE user equipment and an LTE-A user equipment operating in the Rel-8 compatible frequency-domain resource segment.

In the section (d) of FIG. 9 and FIG. 10, firstly the RBs in the Rel-8 compatible frequency-domain resource segment are numbered sequentially in an order of ascending frequencies, and then the RBs in the non-backward compatible frequency-domain resource segment are numbered, as described above. In this case, the same RB will appear as being numbered identically to an LTE user equipment and an LTE-A user equipment operating in the Rel-8 compatible frequency-domain resource segment.

In an implementation, the support of some signaling is required, for example, in which a base station signals the bandwidth of the Rel-8 compatible frequency-domain resource, a transmission bandwidth, etc., to an LTE-A user equipment, possibly in cell broadcast.

In the embodiments of the invention, a resource can be extended while ensuring that the location and the definition of a physical resource of a Rel-8 compatible frequency-domain resource segment keep unchanged and the boundaries of physical resources of a non-backward compatible frequency-domain resource segment keep aligned therewith. When a carrier with an odd number of RBs is extended to a carrier with an even number of RBs or a carrier with an even number RBs is extended to a carrier with an odd number of RBs, the boundaries of the RBs of a non-backward compatible frequency-domain resource segment are translated by 6 subcarriers. The solution according to the embodiments of the invention address the problem with usage of physical resources of a Rel-8 compatible frequency-domain resource and a non-backward compatible frequency-domain resource to ensure that an LTE user equipment can normally access and use the physical resources of the Rel-8 compatible frequency-domain resource segment and an LTE-A user equipment can normally access and use the physical resources of the Rel-8 compatible frequency-domain resource segment and the non-backward compatible frequency-domain resource segment.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for receiving downlink data in a wideband evolution system with a transmission bandwidth resource comprising a Rel-8 compatible frequency-domain resource and a non-backward compatible frequency-domain resource, the method comprising:
   dividing the transmission bandwidth resource into a plurality of frequency-domain resource blocks, each of which corresponds to a Resource Block, RB, number, wherein frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource, and the method further comprises:
   a wideband evolution user equipment, upon reception of downlink control signaling, comprising an RB number, transmitted from the network side, obtaining a frequency-domain resource block corresponding to the RB number in the downlink control signaling and receiving downlink data over the obtained frequency-domain resource block,
   wherein the Rel-8 compatible frequency-domain resource is located in a middle frequency segment of the transmission bandwidth resource, and the non-backward compatible frequency-domain resource is located at a low frequency segment and/or a high frequency segment of the transmission bandwidth resource,
   wherein if the Rel-8 compatible frequency-domain resource is located in the middle frequency segment of the transmission bandwidth resource and the non-backward compatible frequency-domain resource is located at the low frequency and high frequency segments of the transmission bandwidth resource, numbering sequentially the frequency-domain resource blocks corresponding to the non-backward compatible frequency-domain resource with reference to the largest one among the numbers corresponding to the Rel-8 compatible frequency-domain resource comprises:
   numbering sequentially frequency-domain resource blocks corresponding to a high frequency segment of the non-backward compatible frequency-domain resource in an order of ascending frequencies with reference to the largest one among the numbers corresponding to the Rel-8 compatible frequency-domain resource, and then numbering sequentially frequency-domain resource blocks corresponding to a low frequency segment of the non-backward compatible frequency-domain resource in an order of ascending frequencies with reference to the largest one among the numbers of the frequency-domain resource blocks corresponding to the high frequency segment of the non-backward compatible frequency-domain resource; or
   numbering sequentially frequency-domain resource blocks corresponding to a low frequency segment of the non-backward compatible frequency-domain resource in an order of ascending frequencies with reference to the largest one among the numbers corresponding to the Rel-8 compatible frequency-domain resource, and then numbering sequentially frequency-domain resource blocks corresponding to a high frequency segment of the non-backward compatible frequency-domain resource in an order of ascending frequencies with reference to the largest one among the numbers of the frequency-domain resource blocks corresponding to the low frequency segment of the non-backward compatible frequency-domain resource.

2. The method according to claim 1, wherein if both the transmission bandwidth resource of the wideband evolution system and the Rel-8 compatible frequency-domain resource are dividable into an even number of frequency-domain resource blocks or both the transmission bandwidth resource of the wideband evolution system and the Rel-8 compatible frequency-domain resource are dividable into an odd number of frequency-domain resource blocks, all the bandwidth resource of the transmission bandwidth resource is divided into a plurality of frequency-domain resource blocks; or
   wherein if the transmission bandwidth resource of the wideband evolution system is dividable into an even number of frequency-domain resource blocks and the Rel-8 compatible frequency-domain resource is dividable into an odd number of frequency-domain resource blocks, or the transmission bandwidth resource of the wideband evolution system is dividable into an odd number of frequency-domain resource blocks and the Rel-8 compatible frequency-domain resource is dividable into an even number of frequency-domain resource blocks, a part of the bandwidth resource of the transmission bandwidth resource is divided into a plurality of frequency-domain resource blocks.

3. The method according to claim 2, wherein if the Rel-8 compatible frequency-domain resource is located in a middle frequency segment of the transmission bandwidth resource and the non-backward compatible frequency-domain resource is located at low frequency and high frequency segments of the transmission bandwidth resource, dividing a part of the bandwidth resource of the transmission bandwidth resource into a plurality of frequency-domain resource blocks comprises:

reserving symmetrically a physical resource with the size of half a frequency-domain resource block respectively in a high frequency segment and a low frequency segment of the non-backward compatible frequency-domain resource, and dividing the high frequency segment and the low frequency segment, reserved physical resources with the size of half a frequency-domain resource block, of the non-backward compatible frequency-domain resource respectively into frequency-domain resource blocks while no data is transmitted over the reserved physical resources.

4. The method according to claim 3, wherein if the Rel-8 compatible frequency-domain resource is located in the middle frequency segment of the transmission bandwidth resource and the non-backward compatible frequency-domain resource is located at the low frequency and high frequency segments of the transmission bandwidth resource, reserving symmetrically a physical resource with the size of half a frequency-domain resource block respectively in the high frequency segment and the low frequency segment of the non-backward compatible frequency-domain resource comprises:

reserving a physical resource with the size of half a frequency-domain resource block starting with the highest frequency in the high frequency segment of the non-backward compatible frequency-domain resource, and reserving a physical resource with the size of half a frequency-domain resource block starting with the lowest frequency in the low frequency segment of the non-backward compatible frequency-domain resource; or reserving a physical resource with the size of half a frequency-domain resource block starting with the lowest frequency in the high frequency segment of the non-backward compatible frequency-domain resource, and reserving a physical resource with the size of half a frequency-domain resource block starting with the highest frequency in the low frequency segment of the non-backward compatible frequency-domain resource.

5. A method for allocating a downlink resource in a wideband evolution system with a transmission bandwidth resource comprising a Rel-8 compatible frequency-domain resource and a non-backward compatible frequency-domain resource, the method comprising:

dividing the transmission bandwidth resource into a plurality of frequency-domain resource blocks, for each of which a Resource Block, RB, number is set, wherein the frequency-domain resource blocks are numbered sequentially starting with the lowest frequency is a numbering scheme for a wideband evolution user equipment and the frequency-domain resource blocks are numbered in a numbering scheme of an LTE system for an LTE user equipment, and the method further comprises:

determining at the network side the type of a user equipment for which a resource is to be allocated, allocating a downlink frequency-domain resource block for the user equipment according to the type of the user equipment, wherein the number of the allocated downlink frequency-domain resource block is determined in the numbering scheme for a wideband evolution user equipment if the user equipment is a wideband evolution user equipment or the number of the allocated downlink frequency-domain resource block is determined in the numbering scheme for an LTE user equipment if the user equipment is an LTE user equipment, wherein if both the transmission bandwidth resource of the wideband evolution system and the Rel-8 compatible frequency-domain resource are dividable into an even number of frequency-domain resource blocks or both the transmission bandwidth resource of the wideband evolution system and the Rel-8 compatible frequency-domain resource are dividable into an odd number of frequency-domain resource blocks, all the bandwidth resource of the transmission bandwidth resource is divided into a plurality of frequency-domain resource blocks; or wherein if the transmission bandwidth resource of the wideband evolution system is dividable into an even number of frequency-domain resource blocks and the Rel-8 compatible frequency-domain resource is dividable into an odd number of frequency-domain resource blocks, or the transmission bandwidth resource of the wideband evolution system is dividable into an odd number of frequency-domain resource blocks and the Rel-8 compatible frequency-domain resource is dividable into an even number of frequency-domain resource blocks, a part of the bandwidth resource of the transmission bandwidth resource is divided into a plurality of frequency-domain resource blocks, wherein if the Rel-8 compatible frequency-domain resource is located in a middle frequency segment of the transmission bandwidth resource and the non-backward compatible frequency-domain resource is located at low frequency and high frequency segments of the transmission bandwidth resource, dividing a part of the bandwidth resource of the transmission bandwidth resource into a plurality of frequency-domain resource blocks comprises:

reserving symmetrically a physical resource with the size of half a frequency-domain resource block respectively in a high frequency segment and a low frequency segment of the non-backward compatible frequency-domain resource, and dividing the high frequency segment and the low frequency segment, reserved physical resources with the size of half a frequency-domain resource block, of the non-backward compatible frequency-domain resource respectively into frequency-domain resource blocks while no data is transmitted over the reserved physical resources, wherein reserving symmetrically a physical resource with the size of half a frequency-domain resource block respectively in the high frequency segment and the low frequency segment of the non-backward compatible frequency-domain resource comprises:

reserving a physical resource with the size of half a frequency-domain resource block starting with the highest frequency in the high frequency segment of the non-backward compatible frequency-domain resource, and reserving a physical resource with the size of half a frequency-domain resource block starting with the lowest frequency in the low frequency segment of the non-backward compatible frequency-domain resource; or reserving a physical resource with the size of half a frequency-domain resource block starting with the lowest frequency in the high frequency segment of the non-backward compatible frequency-domain resource, and reserving a physical resource with the size of half a frequency-domain resource block starting with the highest frequency in the low frequency segment of the non-backward compatible frequency-domain resource.

6. A method for receiving downlink data in a wideband evolution system with a transmission bandwidth resource comprising a Rel-8 compatible frequency-domain resource and a non-backward compatible frequency-domain resource, the method comprising:

dividing the transmission bandwidth resource into a plurality of frequency-domain resource blocks, each of which corresponds to a Resource Block, RB, number, wherein the frequency-domain resource blocks are numbered sequentially in an order of ascending frequencies, and the method further comprises:

a wideband evolution user equipment, upon reception of downlink control signaling, comprising an RB number, transmitted from the network side, obtaining a frequency-domain resource block corresponding to the RB number in the downlink control signaling and receiving downlink data over the obtained frequency-domain resource block, wherein if both the transmission bandwidth resource of the wideband evolution system and the Rel-8 compatible frequency-domain resource are dividable into an even number of frequency-domain resource blocks or both the transmission bandwidth resource of the wideband evolution system and the Rel-8 compatible frequency-domain resource are dividable into an odd number of frequency-domain resource blocks, all the bandwidth resource of the transmission bandwidth resource is divided into a plurality of frequency-domain resource blocks; or wherein if the transmission bandwidth resource of the wideband evolution system is dividable into an even number of frequency-domain resource blocks and the Rel-8 compatible frequency-domain resource is dividable into an odd number of frequency-domain resource blocks, or the transmission bandwidth resource of the wideband evolution system is dividable into an odd number of frequency-domain resource blocks and the Rel-8 compatible frequency-domain resource is dividable into an even number of frequency-domain resource blocks, a part of the bandwidth resource of the transmission bandwidth resource is divided into a plurality of frequency-domain resource blocks, wherein if the Rel-8 compatible frequency-domain resource is located in a middle frequency segment of the transmission bandwidth resource and the non-backward compatible frequency-domain resource is located at low frequency and high frequency segments of the transmission bandwidth resource, dividing a part of the bandwidth resource of the transmission bandwidth resource into a plurality of frequency-domain resource blocks comprises:

reserving symmetrically a physical resource with the size of half a frequency-domain resource block respectively in a high frequency segment and a low frequency segment of the non-backward compatible frequency-domain resource, and dividing the high frequency segment and the low frequency segment, reserved physical resources with the size of half a frequency-domain resource block, of the non-backward compatible frequency-domain resource respectively into frequency-domain resource blocks while no data is transmitted over the reserved physical resources, wherein reserving symmetrically a physical resource with the size of half a frequency-domain resource block respectively in the high frequency segment and the low frequency segment of the non-backward compatible frequency-domain resource comprises:

reserving a physical resource with the size of half a frequency-domain resource block starting with the highest frequency in the high frequency segment of the non-backward compatible frequency-domain resource, and reserving a physical resource with the size of half a frequency-domain resource block starting with the lowest frequency in the low frequency segment of the non-backward compatible frequency-domain resource; or reserving a physical resource with the size of half a frequency-domain resource block starting with the lowest frequency in the high frequency segment of the non-backward compatible frequency-domain resource, and reserving a physical resource with the size of half a frequency-domain resource block starting with the highest frequency in the low frequency segment of the non-backward compatible frequency-domain resource.

7. A method for allocating a downlink resource in a wideband evolution system with a transmission bandwidth resource comprising a Rel-8 compatible frequency-domain resource and a non-backward compatible frequency-domain resource, the method comprising:

dividing the transmission bandwidth resource into a plurality of frequency-domain resource blocks, each of which corresponds to a Resource Block, RB, number, wherein frequency-domain resource blocks corresponding to the Rel-8 compatible frequency-domain resource are numbered in a numbering scheme of an LTE system and frequency-domain resource blocks corresponding to the non-backward compatible frequency-domain resource are numbered sequentially with reference to the largest one among the numbers corresponding to the Rel-8 compatible frequency-domain resource, and the method further comprises:

determining at the network side in allocation of a downlink frequency-domain resource block for a wideband evolution user equipment an RB number corresponding to the downlink frequency-domain resource block allocated for the wideband evolution user equipment, and transmitting the determined RB number to the wideband evolution user equipment, wherein the Rel-8 compatible frequency-domain resource is located in a middle frequency segment of the transmission bandwidth resource, and the non-backward compatible frequency-domain resource is located at a low frequency segment and/or a high frequency segment of the transmission bandwidth resource, wherein if the Rel-8 compatible frequency-domain resource is located in the middle frequency segment of the transmission bandwidth resource and the non-backward compatible frequency-domain resource is located at the low frequency and high frequency segments of the transmission bandwidth resource, numbering sequentially the frequency-domain resource blocks corresponding to the non-backward compatible frequency-domain resource with reference to the largest one among the numbers corresponding to the Rel-8 compatible frequency-domain resource comprises:

numbering sequentially frequency-domain resource blocks corresponding to a high frequency segment of the non-backward compatible frequency-domain resource in an order of ascending frequencies with reference to the largest one among the numbers corresponding to the Rel-8 compatible frequency-domain resource, and then numbering sequentially frequency-domain resource blocks corresponding to a low frequency segment of the non-backward compatible frequency-domain resource in an order of ascending frequencies with reference to the largest one among the numbers of the frequency-domain resource blocks corresponding to the high frequency segment of the non-backward compatible frequency-domain resource; or numbering sequentially frequency-domain resource blocks corresponding to a low frequency segment of the non-backward compatible frequency-domain resource in an order of ascending frequencies with reference to the largest one among the numbers corresponding to the Rel-8 compatible frequency-domain resource, and then numbering sequentially frequency-domain resource blocks corresponding to a high frequency segment of the non-backward compatible frequency-domain resource in an order of ascending frequencies with reference to the largest one among the numbers of the frequency-domain resource blocks corresponding to the low frequency segment of the non-backward compatible frequency-domain resource.

8. The method according to claim 7, wherein if both the transmission bandwidth resource of the wideband evolution system and the Rel-8 compatible frequency-domain resource are dividable into an even number of frequency-domain resource blocks or both the transmission bandwidth resource of the wideband evolution system and the Rel-8 compatible frequency-domain resource are dividable into an odd number of frequency-domain resource blocks, all the bandwidth resource of the transmission bandwidth resource is divided into a plurality of frequency-domain resource blocks; or wherein if the transmission bandwidth resource of the wideband evolution system is dividable into an even number of frequency-domain resource blocks and the Rel-8 compatible frequency-domain resource is dividable into an odd number of frequency-domain resource blocks, or the transmission bandwidth resource of the wideband evolution system is dividable into an odd number of frequency-domain resource blocks and the Rel-8 compatible frequency-domain resource is dividable into an even number of frequency-domain resource blocks, a part of the bandwidth resource of the transmission bandwidth resource is divided into a plurality of frequency-domain resource blocks.

9. The method according to claim 8, wherein if the Rel-8 compatible frequency-domain resource is located in a middle frequency segment of the transmission bandwidth resource and the non-backward compatible frequency-domain resource is located at low frequency and high frequency segments of the transmission bandwidth resource, dividing a part of the bandwidth resource of the transmission bandwidth resource into a plurality of frequency-domain resource blocks comprises:

reserving symmetrically a physical resource with the size of half a frequency-domain resource block respectively in a high frequency segment and a low frequency segment of the non-backward compatible frequency-domain resource, and dividing the high frequency segment and the low frequency segment, reserved physical resources with the size of half a frequency-domain resource block, of the non-backward compatible frequency-domain resource respectively into frequency-domain resource blocks while no data is transmitted over the reserved physical resources.

10. The method according to claim 9, wherein if the Rel-8 compatible frequency-domain resource is located in the middle frequency segment of the transmission bandwidth resource and the non-backward compatible frequency-domain resource is located at the low frequency and high frequency segments of the transmission bandwidth resource, reserving symmetrically a physical resource with the size of half a frequency-domain resource block respectively in the high frequency segment and the low frequency segment of the non-backward compatible frequency-domain resource comprises:

reserving a physical resource with the size of half a frequency-domain resource block starting with the highest frequency in the high frequency segment of the non-backward compatible frequency-domain resource, and reserving a physical resource with the size of half a frequency-domain resource block starting with the lowest frequency in the low frequency segment of the non-backward compatible frequency-domain resource; or reserving a physical resource with the size of half a frequency-domain resource block starting with the lowest frequency in the high frequency segment of the non-backward compatible frequency-domain resource, and reserving a physical resource with the size of half a frequency-domain resource block starting with the highest frequency in the low frequency segment of the non-backward compatible frequency-domain resource.

* * * * *